(12) United States Patent
Cody et al.

(10) Patent No.: US 7,282,137 B2
(45) Date of Patent: Oct. 16, 2007

(54) PROCESS FOR PREPARING BASESTOCKS HAVING HIGH VI

(75) Inventors: Ian A. Cody, Baton Rouge, LA (US); William J. Murphy, Baton Rouge, LA (US); Sylvain Hantzer, Praireville, LA (US); David W. Larkin, Baton Rouge, LA (US); John E. Gallagher, Jr., Fairfax Station, VA (US); Jeenok T. Kim, Fairfax, VA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 380 days.

(21) Appl. No.: 10/678,689

(22) Filed: Oct. 3, 2003

(65) Prior Publication Data
US 2004/0108249 A1   Jun. 10, 2004

Related U.S. Application Data

(60) Provisional application No. 60/416,865, filed on Oct. 8, 2002.

(51) Int. Cl.
*C10G 45/00* (2006.01)
(52) U.S. Cl. .................. 208/89; 208/209; 208/254 H; 208/251 H; 208/143; 208/212
(58) Field of Classification Search .................. None
See application file for complete search history.

(56) References Cited

U.S. PATENT DOCUMENTS 2,250,410 A   7/1941   Peski .................... 260/676
3,711,399 A   1/1973   Estes .................... 208/112
4,097,364 A   6/1978   Egan .................... 208/111
4,181,597 A   1/1980   Yan et al. .............. 208/46
4,335,019 A   6/1982   Bowes et al. ........... 252/450
4,377,469 A   3/1983   Shihabi ................. 208/111
4,388,177 A   6/1983   Bowes et al. ........... 208/111
4,397,827 A   8/1983   Chu ..................... 423/326
4,402,866 A   9/1983   Shihabi ................. 252/455
4,431,516 A   2/1984   Baird et al. ............ 208/111

(Continued)

FOREIGN PATENT DOCUMENTS

EP   0140468   5/1985

(Continued)

OTHER PUBLICATIONS

J.S. Beck, et al.: "A New Family of Mesoporous Molecular Sieves Prepared With Liquid Crystal Templates", J. Amer. Chem. Soc., 1992, vol. 114, p. 10834-843.

(Continued)

*Primary Examiner*—Tam M. Nguyen
(74) *Attorney, Agent, or Firm*—J. J. Kliebert; Lawrence E. Carter

(57) ABSTRACT

A process for preparing high VI lubricating oil basestocks comprising hydrotreating, hydrodewaxing and optionally hydrofinishing. The hydrotreating step is under conditions such that the amount of conversion to 343° C. minus is less than 5 wt. % of the feedstock and the VI increase is less than 4 VI over the feedstock. Hydrodewaxing uses a low alpha catalyst and hydrofinishing is accomplished with a catalyst based on the M41S family.

26 Claims, 1 Drawing Sheet

U.S. PATENT DOCUMENTS

| | | | |
|---|---|---|---|
| 4,431,517 A | 2/1984 | Nevitt et al. | 208/111 |
| 4,431,519 A | 2/1984 | LaPierre et al. | 208/111 |
| 4,431,527 A | 2/1984 | Miller et al. | 208/254 |
| 4,436,614 A | 3/1984 | Olbrich et al. | 208/89 |
| 4,440,871 A | 4/1984 | Lok et al. | 502/214 |
| 4,460,698 A | 7/1984 | Hensley, Jr. et al. | 502/66 |
| 4,483,764 A | 11/1984 | Hensley, Jr. et al. | 208/111 |
| 4,490,242 A | 12/1984 | Oleck et al. | 208/97 |
| 4,510,045 A | 4/1985 | Dessau | 208/111 |
| 4,568,449 A | 2/1986 | Angmorter et al. | 208/215 |
| 4,585,747 A | 4/1986 | Valyocsik | 502/62 |
| 4,594,146 A | 6/1986 | Chester et al. | 208/111 |
| 4,599,162 A | 7/1986 | Yen | 208/59 |
| 4,601,993 A | 7/1986 | Chu et al. | 502/66 |
| 4,610,778 A | 9/1986 | Graven | 208/89 |
| 4,622,130 A | 11/1986 | Stem | 208/87 |
| 4,636,299 A | 1/1987 | Unmuth et al. | 208/87 |
| 4,684,756 A | 8/1987 | Derr, Jr. et al. | 585/330 |
| 4,784,747 A | 11/1988 | Shihabi | 208/111 |
| 4,810,357 A | 3/1989 | Chester et al. | 208/78 |
| 4,900,707 A | 2/1990 | Cody et al. | 502/230 |
| 4,906,350 A * | 3/1990 | Lucien et al. | 208/97 |
| 4,911,821 A | 3/1990 | Katzer et al. | 208/27 |
| 4,919,788 A | 4/1990 | Chen et al. | 208/59 |
| 4,975,177 A | 12/1990 | Garwood et al. | 208/27 |
| 5,017,535 A | 5/1991 | Schoonhoven et al. | 502/30 |
| 5,037,528 A | 8/1991 | Garwood et al. | 208/27 |
| 5,059,299 A | 10/1991 | Cody et al. | 208/27 |
| 5,075,269 A | 12/1991 | Degnan et al. | 502/77 |
| 5,082,988 A | 1/1992 | Holtermann | 585/739 |
| 5,098,684 A | 3/1992 | Kresge et al. | 423/277 |
| 5,146,022 A | 9/1992 | Buchanan et al. | 585/12 |
| 5,198,203 A | 3/1993 | Kresge et al. | 423/718 |
| 5,208,403 A | 5/1993 | Buchanan et al. | 585/7 |
| 5,227,353 A | 7/1993 | Apelian et al. | 502/74 |
| 5,232,579 A | 8/1993 | Absil et al. | 208/113 |
| 5,246,566 A | 9/1993 | Miller | 208/27 |
| 5,264,641 A | 11/1993 | Borghard et al. | 585/269 |
| 5,275,719 A | 1/1994 | Baker, Jr. et al. | 208/58 |
| 5,276,229 A | 1/1994 | Buchanan et al. | 585/255 |
| 5,282,958 A | 2/1994 | Santilli et al. | 208/111 |
| 5,288,395 A | 2/1994 | Marler et al. | 208/58 |
| 5,292,983 A | 3/1994 | Sie | 585/733 |
| 5,358,628 A | 10/1994 | Apelian et al. | 208/60 |
| 5,447,623 A | 9/1995 | Ward | 208/111.15 |
| 5,498,821 A | 3/1996 | Ryan et al. | 585/750 |
| 5,516,736 A | 5/1996 | Chang et al. | 502/64 |
| 5,573,657 A | 11/1996 | Degnan et al. | 208/144 |
| 5,643,440 A | 7/1997 | Borghard et al. | 208/58 |
| 5,689,031 A | 11/1997 | Berlowitz et al. | 585/734 |
| 5,730,858 A | 3/1998 | Olivier et al. | 208/28 |
| 5,837,639 A * | 11/1998 | Kresge et al. | 502/64 |
| 5,911,874 A | 6/1999 | Cody et al. | 208/87 |
| 5,935,417 A | 8/1999 | Cody et al. | 208/87 |
| 5,951,848 A | 9/1999 | Baker, Jr. et al. | 208/28 |
| 5,993,644 A | 11/1999 | Xiao et al. | 208/89 |
| 6,013,171 A | 1/2000 | Cook et al. | 208/27 |
| 6,051,129 A | 4/2000 | Harris et al. | 208/138 |
| 6,068,757 A | 5/2000 | Walker, III | 208/58 |
| 6,080,301 A | 6/2000 | Berlowitz et al. | 208/18 |
| 6,090,989 A | 7/2000 | Trewella et al. | 585/13 |
| 6,096,189 A | 8/2000 | Cody et al. | 208/87 |
| 6,099,719 A | 8/2000 | Cody et al. | 208/87 |
| 6,103,101 A | 8/2000 | Fragelli et al. | 208/89 |
| 6,136,181 A | 10/2000 | Ziemer | 208/144 |
| 6,179,994 B1 | 1/2001 | Clark et al. | 208/27 |
| 6,190,532 B1 | 2/2001 | Degnan et al. | 208/27 |
| 6,231,749 B1 | 5/2001 | Degnan et al. | 208/27 |
| 6,264,826 B1 * | 7/2001 | Xiao et al. | 208/18 |
| 6,294,077 B1 | 9/2001 | Dougherty et al. | 208/27 |
| 6,303,534 B1 | 10/2001 | Strohmaier et al. | 502/214 |
| 6,310,265 B1 | 10/2001 | Chester et al. | 585/739 |
| 6,322,692 B1 | 11/2001 | Cody et al. | 208/18 |
| 6,337,010 B1 | 1/2002 | Hofer | 208/58 |
| 6,383,366 B1 | 5/2002 | Riley et al. | 208/137 |
| 6,399,845 B1 | 6/2002 | Raulo et al. | 585/739 |
| 6,420,618 B1 | 7/2002 | Berlowitz et al. | 585/310 |
| 6,663,768 B1 | 12/2003 | Miller | 208/27 |
| 2001/0004972 A1 | 6/2001 | Miller et al. | 208/18 |
| 2001/0006154 A1 | 7/2001 | Krug et al. | 208/18 |
| 2002/0003102 A1 | 1/2002 | O'Rear et al. | 208/18 |
| 2003/0168379 A1 | 9/2003 | Degnan et al. | 208/27 |

FOREIGN PATENT DOCUMENTS

| | | |
|---|---|---|
| EP | 0147873 | 3/1988 |
| EP | 0635557 | 1/1995 |
| EP | 0707057 | 4/1996 |
| EP | 0776959 | 6/1997 |
| EP | WO99/41336 | 8/1999 |
| EP | 0909304 | 9/2001 |
| EP | WO 02/48283 | 6/2002 |
| FR | 2805543 | 2/2000 |
| FR | WO 01/18156 | 3/2001 |
| FR | 2805542 | 8/2001 |
| FR | WO 01/64339 | 9/2001 |
| GB | 772478 | 4/1957 |
| GB | 1582789 | 1/1981 |
| GB | 2109402 | 6/1983 |
| GB | 2311789 | 10/1997 |
| NL | WO 01/07538 | 2/2001 |
| NL | WO 02/99014 | 12/2002 |
| SU | 1696391 | 12/1991 |
| WO | WO96/03359 | 2/1996 |
| WO | WO97/18278 | 5/1997 |
| WO | WO98/02502 | 1/1998 |
| WO | WO98/18883 | 5/1998 |
| WO | WO99/20720 | 4/1999 |
| WO | WO 00/78677 | 12/2000 |
| WO | WO 02/42207 | 5/2002 |
| WO | WO 02/48291 | 6/2002 |
| WO | WO 02/88279 | 11/2002 |

OTHER PUBLICATIONS

N.Y. Chen, et al.: "TMA-Offretite, Relationship Between Structural and Catalytic Properties", J. Catalysis, 1984, vol. 86, p. 24-31.

* cited by examiner

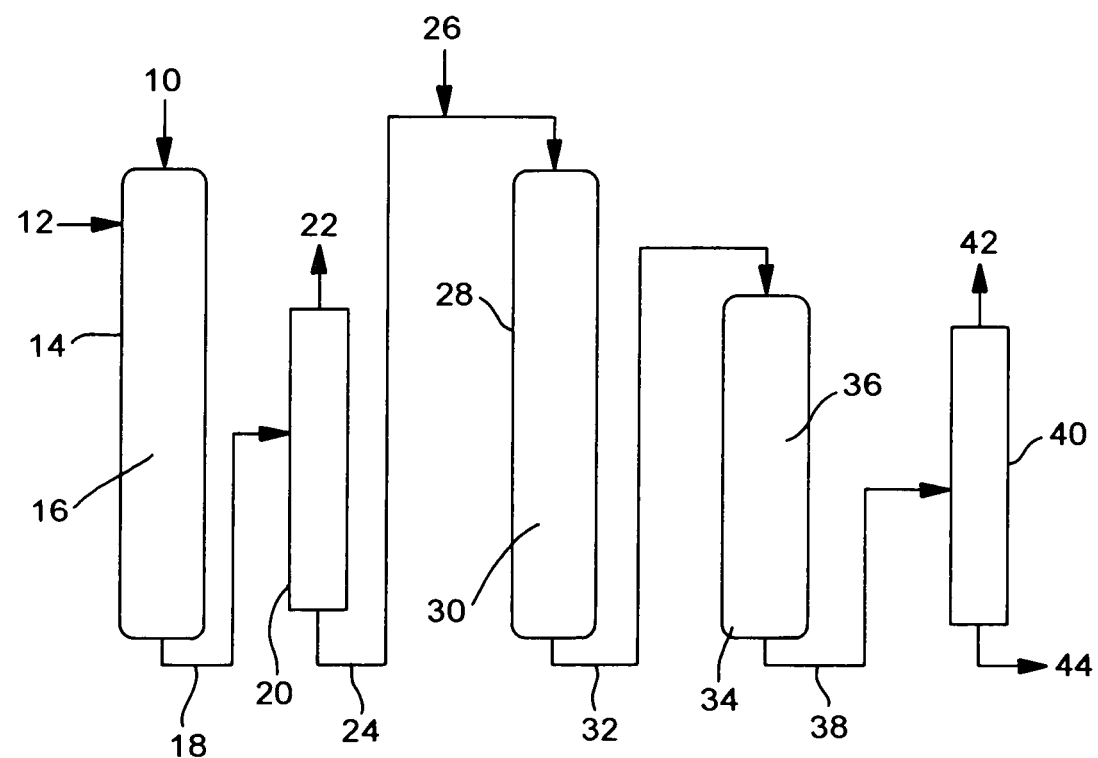

PROCESS FOR PREPARING BASESTOCKS HAVING HIGH VI

CROSS-REFERENCE TO RELATED APPLICATION

This patent application claims benefit of U.S. Provisional Patent Application Ser. No. 60/416,865 filed Oct. 8, 2002.

FIELD OF THE INVENTION

This invention relates to a process for preparing lubricating oil basestocks having a high viscosity index (VI) from wax containing feeds. More particularly, a wax containing feedstock is hydrotreated under mild conditions, catalytically hydrodewaxed and hydrofinished.

BACKGROUND OF THE INVENTION

Historically, lubricating oil products for use in applications such as automotive engine oils have used additives to improve specific properties of the basestocks used to prepare the finished products. With the advent of increased environmental concerns, the performance requirements for the basestocks themselves have increased. American Petroleum Institute (API) requirements for Group II basestocks include a saturates content of at least 90%, a sulfur content of 0.03 wt. % or less and a viscosity index (VI) between 80 and 120. The requirements for Group III basestocks are those of Group II basestocks except that the VI is at least 120.

Conventional techniques for preparing basestocks such as hydrocracking or solvent extraction require severe operating conditions such as high pressure and temperature or high solvent:oil ratios and high extraction temperatures to reach these higher basestock qualities. Either alternative involves expensive operating conditions and low yields.

Hydrocracking has been combined with hydrotreating as a preliminary step. However, this combination also results in decreased yields of lubricating oils due to the conversion to distillates that typically accompany the hydrocracking process.

It would be desirable to have a economical process for preparing Group III basestocks in high yields by minimizing conversion to low boiling distillates while at the same time producing a product having excellent low temperature properties, high VI and high stability.

SUMMARY OF THE INVENTION

The present invention is directed to a process for preparing a lubricating oil basestock having a VI of at least about 135 which comprises:
(1) hydrotreating a lubricating oil feedstock having a wax content of at least about 60 wt. %, based on feedstock, with a hydrotreating catalyst under effective hydrotreating conditions such that less than 5 wt. % of the feedstock is converted to 650° F. (343° C.) minus products to produce a hydrotreated feedstock whose VI increase is less than 4 greater than the VI of the feedstock;
(2) stripping the hydrotreated feedstock to separate gaseous from liquid product; and
(3) hydrodewaxing the liquid product with a dewaxing catalyst which is at least one of ZSM-48, ZSM-57, ZSM-23, ZSM-22, ZSM-35, ferrierite, ECR-42, ITQ-13, MCM-71, MCM-68, beta, fluorided alumina, silica-alumina or fluorided silica alumina under catalytically effective hydrodewaxing conditions wherein the dewaxing catalyst contains at least one Group 9 or Group 10 noble metal.

Another embodiment relates to a process for preparing a lubricating oil basestock having a VI of at least about 125 which comprises:
(1) hydrotreating a lubricating oil feedstock having a wax content of at least about 50 wt. %, based on feedstock, with a hydrotreating catalyst under effective hydrotreating conditions such that less than 5 wt. % of the feedstock is converted to 650° F. (343° C.) minus products to produce a hydrotreated feedstock to produce a hydrotreated feedstock whose VI increase is less than 4 greater than the VI of the feedstock;
(2) stripping the hydrotreated feedstock to separate gaseous from liquid product;
(3) hydrodewaxing the liquid product with a dewaxing catalyst which is at least one of ZSM-22, ZSM-23, ZSM-35, ferrierite, ZSM-48, ZSM-57, ECR-42, ITQ-13, MCM-68, MCM-71, beta, fluorided alumina, silica-alumina or fluorided silica-alumina under catalytically effective hydrodewaxing conditions wherein the dewaxing catalyst contains at least one Group 9 or 10 noble metal; and
(4) hydrofinishing the product from step (3) with a mesoporous hydrofinishing catalyst from the M41S family under hydrofinishing conditions.

Another embodiment relates to a process for preparing a lubricating oil basestock having a VI of at least about 135 which comprises:
(1) hydrotreating a lubricating oil feedstock having a wax content of at least about 60 wt. %, based on feedstock, with a hydrotreating catalyst under effective hydrotreating conditions such that less than 5 wt. % of the feedstock is converted to 650° F. (343° C.) minus products to produce a hydrotreated feedstock to produce a hydrotreated feedstock whose VI increase is less than 4 greater than the VI of the feedstock;
(2) stripping the hydrotreated feedstock to separate gaseous from liquid product;
(3) hydrodewaxing the liquid product with a dewaxing catalyst which is ZSM-48 under catalytically effective hydrodewaxing conditions wherein the dewaxing catalyst contains at least one Group 9 or 10 noble metal; and
(4) hydrofinishing the product from step (3) with MCM-41 under hydrofinishing conditions.

The basestocks according to the invention meet the requirements of a Group III basestock and can be prepared in high yields while at the same time possessing excellent properties such as high VI and low pour point.

BRIEF DESCRIPTION OF THE DRAWINGS

The FIGURE is a schematic flow diagram of the process.

DETAILED DESCRIPTION OF THE INVENTION

Feedstocks

The feedstock used in the process of the invention are wax-containing feeds that boil in the lubricating oil range, typically having a 10% distillation point greater than 650° F. (343° C.), measured by ASTM D 86 or ASTM 2887, and are derived from mineral or synthetic sources. The wax content of the feedstock is at least about 50 wt. %, based on feedstock and can range up to 100 wt. % wax. The wax content of a feed may be determined by nuclear magnetic resonance spectroscopy (ASTM D5292), by correlative ndM methods (ASTM D3238) or by solvent means (ASTM D3235). The waxy feeds may be derived from a number of sources such as oils derived from solvent refining processes such as raffinates, partially solvent dewaxed oils, deasphalted oils, distillates, vacuum gas oils, coker gas oils, slack waxes, foots oils and the like, and Fischer-Tropsch waxes. Preferred feeds are slack waxes and Fischer-Tropsch waxes. Slack waxes are typically derived from hydrocarbon feeds by solvent or propane dewaxing. Slack waxes contain some residual oil and are typically deoiled. Foots oils are derived from deoiled slack waxes. Fischer-Tropsch waxes are prepared by the Fischer-Tropsch synthetic process.

Feedstocks may have high contents of nitrogen- and sulfur-contaminants. Feeds containing up to 0.2 wt. % of nitrogen, based on feed and up to 3.0 wt. % of sulfur can be processed in the present process. Feeds having a high wax content typically have high viscosity indexes of up to 200 or more. Sulfur and nitrogen contents may be measured by standard ASTM methods D5453 and D4629, respectively.

For feeds derived from solvent extraction, the high boiling petroleum fractions from atmospheric distillation are sent to a vacuum distillation unit, and the distillation fractions from this unit are solvent extracted. The residue from vacuum distillation may be deasphalted. The solvent extraction process selectively dissolves the aromatic components in an extract phase while leaving the more paraffinic components in a raffinate phase. Naphthenes are distributed between the extract and raffinate phases. Typical solvents for solvent extraction include phenol, furfural and N-methyl pyrrolidone. By controlling the solvent to oil ratio, extraction temperature and method of contacting distillate to be extracted with solvent, one can control the degree of separation between the extract and raffinate phases.

Hydrotreating

For hydrotreating, the catalysts are those effective for hydrotreating such as catalysts containing Group 6 metals (based on the IUPAC Periodic Table format having Groups from 1 to 18), Groups 8-10 metals, and mixtures thereof. Preferred metals include nickel, tungsten, molybdenum, cobalt and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst. Suitable metal oxide supports include oxides such as silica, alumina, silica-aluminas or titania, preferably alumina. Preferred aluminas are porous aluminas such as gamma or eta. The amount of metals, either individually or in mixtures, ranges from about 0.5 to 35 wt. %, based on the catalyst. In the case of preferred mixtures of groups 9-10 metals with group 6 metals, the groups 9-10 metals are present in amounts of from 0.5 to 5 wt. %, based on catalyst and the group 6 metals are present in amounts of from 5 to 30 wt. %. The amounts of metals may be measured by atomic absorption spectroscopy, inductively coupled plasma-atomic emission spectrometry or other methods specified by ASTM for individual metals.

The acidity of metal oxide supports can be controlled by adding promoters and/or dopants, or by controlling the nature of the metal oxide support, e.g., by controlling the amount of silica incorporated into a silica-alumina support. Examples of promoters and/or dopants include halogen, especially fluorine, phosphorus, boron, yttria, rare-earth oxides and magnesia. Promoters such as halogens generally increase the acidity of metal oxide supports while mildly basic dopants such as yttria or magnesia tend to decrease the acidity of such supports.

Hydrotreating conditions include temperatures of from 150 to 400° C., preferably 200 to 350° C., a hydrogen partial pressure of from 1480 to 20786 kPa (200 to 3000 psig), preferably 2859 to 13891 kPa (400 to 2000 psig), a space velocity of from 0.1 to 10 liquid hourly space velocity (LHSV), preferably 0.1 to 5 LHSV, and a hydrogen to feed ratio of from 89 to 1780 $m^3/m^3$ (500 to 10000 scf/B), preferably 178 to 890 $m^3/m^3$.

Hydrotreating reduces the amount of nitrogen- and sulfur-containing contaminants to levels which will not unacceptably affect the dewaxing catalyst in the subsequent dewaxing step. Also, there may be certain polynuclear aromatic species which will pass through the present mild hydrotreating step. These contaminants, if present, will be removed in a subsequent hydrofinishing step.

During hydrotreating, less than 5 wt. % of the feedstock, preferably less than 3 wt. %, more preferably less than 2 wt. %, is converted to 650° F. (343° C.) minus products to produce a hydrotreated feedstock whose VI increase is less than 4, preferably less than 3, more preferably less than 2 greater than the VI of the feedstock. The high wax contents of the present feeds results in minimal VI increase during the hydrotreating step.

The hydrotreated feedstock may be passed directly to the dewaxing step or preferably, stripped to remove gaseous contaminants such as hydrogen sulfide and ammonia prior to dewaxing. Stripping can be by conventional means such as flash drums or fractionators Dewaxing Catalyst The dewaxing catalyst may be either crystalline or amorphous. Crystalline materials are molecular sieves that contain at least one 10 or 12 ring channel and may be based on aluminosilicates (zeolites) or on silicoaluminophosphates (SAPOs). Zeolites used for oxygenate treatment may contain at least one 10 or 12 channel. Examples of such zeolites include ZSM-22, ZSM-23, ZSM-35, ZSM-48, ZSM-57, ferrierite, ITQ-13, MCM-68 and MCM-71. Examples of aluminophosphates containing at least one 10 ring channel include ECR-42. Examples of molecular sieves containing 12 ring channels include zeolite beta, and MCM-68. The molecular sieves are described in U.S. Pat. Nos. 5,246,566, 5,282,958, 4,975,177, 4,397,827, 4,585,747, 5,075,269 and 4,440,871. MCM-68 is described in U.S. Pat. No. 6,310,265. MCM-71 and ITQ-13 are described in PCT published applications WO 0242207 and WO 0078677. ECR-42 is disclosed in U.S. Pat. No. 6,303,534. Preferred catalysts include ZSM-48, ZSM-22 and ZSM-23. Especially preferred is ZSM-48. The molecular sieves are preferably in the hydrogen form. Reduction can occur in situ during the dewaxing step itself or can occur ex situ in another vessel.

Amorphous dewaxing catalysts include alumina, fluorided alumina, silica-alumina, fluorided silica-alumina and silica-alumina doped with Group 3 metals. Such catalysts are described for example in U.S. Pat. Nos. 4,900,707 and 6,383,366.

The dewaxing catalysts are bifunctional, i.e., they are loaded with a metal hydrogenation component, which is at least one Group 6 metal, at least one Group 8-10 metal, or mixtures thereof. Preferred metals are Groups 9-10 metals. Especially preferred are Groups 9-10 noble metals such as Pt, Pd or mixtures thereof (based on the IUPAC Periodic Table format having Groups from 1 to 18). These metals are loaded at the rate of 0.1 to 30 wt. %, based on catalyst. Catalyst preparation and metal loading methods are described for example in U.S. Pat. No. 6,294,077, and include for example ion exchange and impregnation using decomposable metal salts. Metal dispersion techniques and catalyst particle size control are described in U.S. Pat. No. 5,282,958. Catalysts with small particle size and well dispersed metal are preferred.

The molecular sieves are typically composited with binder materials which are resistant to high temperatures which may be employed under dewaxing conditions to form a finished dewaxing catalyst or may be binderless (self bound). The binder materials are usually inorganic oxides such as silica, alumina, silica-aluminas, binary combinations of silicas with other metal oxides such as titania, magnesia, thoria, zirconia and the like and tertiary combinations of these oxides such as silica-alumina-thoria and silica-alumina magnesia. The amount of molecular sieve in the finished dewaxing catalyst is from 10 to 100, preferably 35 to 100 wt. %, based on catalyst. Such catalysts are formed by methods such spray drying, extrusion and the like. The dewaxing catalyst may be used in the sulfided or unsulfided form, and is preferably in the sulfided form.

Dewaxing conditions include temperatures of from 250-400° C., preferably 275 to 350° C., pressures of from 791 to 20786 kPa (100 to 3000 psig), preferably 1480 to 17339 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

Hydrofinishing

At least a portion of the product from dewaxing is passed directly to a hydrofinishing step without disengagement. It is preferred to hydrofinish the product resulting from dewaxing in order to adjust product qualities to desired specifications. Hydrofinishing is a form of mild hydrotreating directed to saturating any lube range olefins and residual aromatics as well as to removing any remaining heteroatoms and color bodies. The post dewaxing hydrofinishing is usually carried out in cascade with the dewaxing step. Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV (hr$^{-1}$), preferably 0.5 to 3 hr$^{-1}$ and hydrogen treat gas rates of from 44.5 to 1780 m$^3$/m$^3$ (250 to 10,000 scf/B).

Hydrofinishing catalysts are those containing Group 6 metals (based on the IUPAC Periodic Table format having Groups from 1 to 18), Groups 8-10 metals, and mixtures thereof. Preferred metals include at least one noble metal having a strong hydrogenation function, especially platinum, palladium and mixtures thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst is often as high as about 20 weight percent for non-noble metals. Noble metals are usually present in amounts no greater than about 1 wt. %.

The hydrofinishing catalyst is preferably a mesoporous material belonging to the M41S class or family of catalysts. The M41S family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Å. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198,203 whereas MCM-50 has a lamellar structure. MCM-41 can be made with different size pore openings in the mesoporous range. The mesoporous materials may bear a metal hydrogenation component which is at least one of Group 8, Group 9 or Group 10 metals. Preferred are noble metals, especially Group 10 noble metals, most preferably Pt, Pd or mixtures thereof.

Generally the hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 LHSV (hr$^{-1}$), preferably 0.5 to 3 hr$^{-1}$ and hydrogen treat gas rates of from 44.5 to 1780 m$^3$/m$^3$ (250 to 10,000 scf/B).

The products resulting from the process according to the invention have very high viscosity indices and can be produced in high yields from waxy feeds. Thus, one may obtain lube basestocks having VIs of 145 or greater with excellent low temperature properties.

Referring now to the FIGURE, a waxy feedstock such as a slack wax is fed through line 10 to hydrotreating unit 14. Hydrogen is added to hydrotreating unit 14 through line 12. Hydrotreater 14 is loaded with a bed of hydrotreating catalyst 16. Hydrotreated feedstock is conducted through line 18 to stripper 20 and light gases are removed through line 22. Liquid product is then sent from stripper 20 through line 24 to hydrodewaxing unit 28. Additional hydrogen is added through line 26. Hydrodewaxing unit 28 is loaded with a bed of hydrodewaxing catalyst 30. Hydrodewaxed product is then sent through line 32 to hydrofinishing unit 34 which is loaded with a bed of hydrofinishing catalyst 36. Hydrofinished product is then sent through line 38 to vacuum stripper 40. Light products are removed through line 42 and remaining liquid product sent through line 44 to a vacuum distillation unit (not shown).

The invention is further illustrated by the following examples which are not intended as limiting.

EXAMPLES

Example 1

This example illustrates that processing clean feeds with a sulfided hydrodewaxing catalyst can produce a high quality dewaxed oil at excellent yield. The feed is a 150 N slack wax hydrotreated at low severity of 240° C. whose properties are given in Table 1. Viscosity was measured using standard ASTM tests (D445-94 and D2270-91) using a Houillon Automated Viscometer with a repeatability of 0.5%. Pour points are determined by standard ASTM test (D 97). Sulfur and nitrogen contents may be measured by standard ASTM methods D5453 and D4629, respectively. The error limits for yield and pour points are ±1 and ±3, respectively.

TABLE 1

| | |
|---|---|
| Viscosity, cSt at 100° C. | 3.6 |
| Nitrogen, Wppm | 0.4 |
| Sulfur, Wppm | 120 |
| Oil in wax, wt. % | 7.0 |

The feed from Table 1 was hydrotreated with Akzo Nobel KF848 catalyst under the following hydrotreating conditions: 240° C., LHSV of 0.7 v/v/h, 1000 psig (6996 kPa), treat rate of 1500 scf/B $H_2$ (267 $m^3/m^3$). The hydrotreated product's 370° C.+yield was 94.4 wt. % on feed. The hydrotreated product's properties are given in Table 2.

TABLE 2

| | |
|---|---|
| Viscosity cSt at 100° C. | 3.6 |
| Nitrogen, Wppm | 0.1 |
| Sulfur, Wppm | 2 |

The hydrotreated product was hydrodewaxed with an ex-situ sulfided ZSM-48 catalyst at the following conditions: 1 v/v/h, 1000 psig (6996 kPa), 2500 scf/B $H_2$ (445 $m^3/m^3$). The ZSM-48 catalyst bound with 35 wt. % alumina was loaded with 0.6 wt. % Pt as metal and was ex-situ sulfided with 400 ppm $H_2S$ in nitrogen to $H_2S$ breakthrough. The hydrodewaxed results are given in Table 3.

TABLE 3

| | |
|---|---|
| Average Reactor Temp. ° C. | 329 |
| 370° C. + Yield, wt. % on feed to Hydrodewaxer (HDW) | 53.8 |
| 370° C. + Product Properties | |
| Viscosity at 100° C. (cSt) | 3.3 |
| VI | 136 |
| Pour Point (° C.) | −21 |

The hydrodewaxed product was hydrofinished using a MCM-41 containing Pt/Pd as hydrofinishing catalyst. Hydrodewaxed product was hydrofinished under the following conditions: 200° C., LHSV of 2.5 v/v/h, 1000 psig $H_2$ (6996 kPa), 2500 scf/B $H_2$ (445 $m^3/m^3$). Hydrofinishing using the MCM-41 catalyst enabled the reduction in total aromatics to essentially zero without affecting the other properties of the dewaxed product. This is due to the high saturation activity of this catalyst at low temperatures. The dewaxed products in this and subsequent Examples were hydrofinished in this manner.

Example 2

This example illustrates that processing clean feeds with a sulfided hydrodewaxing catalyst can produce a high quality dewaxed oil at excellent yield. The feed is a 150 N slack wax whose properties are given in Table 4. The feed was hydrotreated at much higher severity of 345° C.

TABLE 4

| | |
|---|---|
| Viscosity, cSt at 100° C. | 3.6 |
| Nitrogen, Wppm | 0.4 |

TABLE 4-continued

| | |
|---|---|
| Sulfur, Wppm | 120 |
| Oil in wax, wt. % | 7.0 |

The feed from Table 4 was hydrotreated with Akzo Nobel KF848 catalyst under the following hydrotreating conditions: 345° C., 0.7 v/v/h, 1000 psig (6996 kPa), 1500 scf/B $H_2$ (267 $m^3/m^3$). The hydrotreated product's 370° C.+yield was 93.2 wt. % on feed. The hydrotreated product's properties are given in Table 5.

TABLE 5

| | |
|---|---|
| Viscosity, cSt at 100° C. | 3.4 |
| Nitrogen, Wppm | 0.1 |
| Sulfur, Wppm | 0 |

The hydrotreated product was hydrodewaxed with an ex-situ sulfided ZSM-48 catalyst at the following conditions: 1 v/v/h, 1000 psig (6996 kPa), 2500 scf/B $H_2$ (445 $m^3/m^3$). The ZSM-48 catalyst (Example 1) was ex-situ sulfided with 400 ppm $H_2S$ in nitrogen to $H_2S$ breakthrough. The product properties from hydrodewaxing results are given in Table 6.

TABLE 6

| | |
|---|---|
| Average Reactor Temp. ° C. | 329 |
| 370° C. + Yield, wt. % on feed to HDW | 52.6 |
| 370° C. + Product Properties | |
| Viscosity at 100° C. (cSt) | 3.3 |
| VI | 134 |
| Pour Point (° C.) | −26 |

Example 3

This example illustrates that processing clean feeds over a reduced hydrodewaxed catalyst can produce a high quality dewaxed oil at excellent yield. The feed is a 150 N slack wax whose properties are given in Table 7.

TABLE 7

| | |
|---|---|
| Viscosity, cSt at 100° C. | 3.6 |
| Nitrogen, Wppm | 0.4 |
| Sulfur, Wppm | 120 |
| Oil in wax, wt. % | 7.0 |

The feed from Table 7 was hydrotreated with Akzo Nobel KF848 catalyst under the following hydrotreating conditions: 345° C., 0.7 v/v/h, 1000 psig (6996 kPa), 1500 scf/B $H_2$ (267 $m^3/m^3$). The hydrotreated product's 370° C.+yield was 93.9 wt. % on feed. The hydrotreated product's properties are given in Table 8.

TABLE 8

| | |
|---|---|
| Viscosity, cSt at 100° C. | 3.4 |
| Nitrogen, Wppm | 0.1 |
| Sulfur, Wppm | 0 |

The hydrotreated product was hydrodewaxed with a reduced ZSM-48 catalyst at the following conditions: 1 v/v/h, 1000 psig (6996 kPa), 2500 scf/B $H_2$ (445 $m^3/m^3$). The hydrodewaxed results are given in Table 9.

TABLE 9

| Average Reactor Temp. ° C. | 330 | 332 |
|---|---|---|
| 370° C. + Yield, wt. % on feed to HDW | 64.9 | 61.8 |
| 370° C. + Product Properties | | |
| Viscosity at 100° C. (cSt) | 3.3 | 3.2 |
| VI | 140 | 136 |
| Pour Point (° C.) | −18 | −23 |

Example 4

This example illustrates that processing clean light feeds over a sulfided hydrodewaxed catalyst can produce a high quality dewaxed oil at excellent yield. The feed is a 150 N slack wax with higher oil content whose properties are given in Table 10.

TABLE 10

| Viscosity, cSt at 100° C. | 3.7 |
|---|---|
| Nitrogen, Wppm | 2 |
| Sulfur, Wppm | 252 |
| Oil in wax, wt. % | 13.5 |

The feed from Table 10 was hydrotreated with Akzo Nobel KF848 catalyst under the following hydrotreating conditions: 270° C., 0.7 v/v/h, 1000 psig (6996 kPa), 1500 scf/B $H_2$ (267 $m^3/m^3$). The hydrotreated product's 370° C.+yield was 95.3 wt. % on feed. The hydrotreated product's properties are given in Table 11.

TABLE 11

| Viscosity, cSt at 100° C. | 3.7 |
|---|---|
| Nitrogen, Wppm | 2 |
| Sulfur, Wppm | 0.5 |

The hydrotreated product was hydrodewaxed with an ex-situ sulfided ZSM-48 catalyst at the following conditions: 1 v/v/h, 1000 psi (6996 kPa), 2500 scf/B $H_2$ (445 $m^3/m^3$). The ZSM-48 catalyst (Example 1) was ex-situ sulfided with 400 ppm $H_2S$ in nitrogen to $H_2S$ breakthrough. The hydrodewaxed results are given in Table 12.

TABLE 12

| Average Reactor Temp. ° C. | 329 | 327 |
|---|---|---|
| 370° C. + Yield, wt. % on feed to HDW | 52.4 | 56.4 |
| 370° C. + Product Properties | | |
| Viscosity at 100° C. (cSt) | 3.4 | 3.4 |
| VI | 133 | 136 |
| Pour Point (° C.) | −27 | −20 |

Example 5

This example illustrates that processing clean feeds over a sulfided catalyst can produce a high quality dewaxed oil at excellent yield. The feed is a 600 N slack wax whose properties are given in Table 13.

TABLE 13

| Viscosity, cSt at 100° C. | 8.0 |
|---|---|
| Nitrogen, Wppm | 14 |
| Sulfur, Wppm | 912 |
| Oil in wax, wt. % | 16.5 |

The feed from Table 13 was hydrotreated with Akzo Nobel KF848 catalyst under the following hydrotreating conditions: 317° C., 0.7 v/v/h, 1000 psig (6996 kPa), 1500 scf/B $H_2$ (267 $m^3/m^3$). The hydrotreated product's 370° C.+yield was 97.3 wt. % on feed. The hydrotreated product's properties are given in Table 14.

TABLE 14

| Viscosity, cSt at 100° C. | 7.5 |
|---|---|
| Nitrogen, Wppm | 3 |
| Sulfur, Wppm | 1 |

The hydrotreated product was hydrodewaxed with an ex-situ sulfided ZSM-48catalyst at the following conditions: 1 v/v/h, 1000 psig (6996 kPa), 2500 scf/B $H_2$ (445 $m^3/m^3$). The ZSM-48 catalyst (Example 1) was ex-situ sulfided with 400 ppm $H_2S$ in nitrogen to $H_2S$ breakthrough. The hydrodewaxed results are given in Table 15.

TABLE 15

| Average Reactor Temp. ° C. | 329 |
|---|---|
| 370° C. + Yield, wt. % on feed to HDW | 61.9 |
| 370° C. + Product Properties | |
| Viscosity at 100° C. (cSt) | 6.5 |
| VI | 145 |
| Pour Point (° C.) | −17 |

Example 6

This example illustrates that processing clean feeds at a higher hydrotreating temperature can produce a high quality dewaxed oil at excellent yield. The feed is a 600 N slack wax whose properties are given in Table 16.

TABLE 16

| Viscosity, cSt at 100° C. | 8.0 |
|---|---|
| Nitrogen, Wppm | 14 |
| Sulfur, Wppm | 912 |
| Oil in wax, wt. % | 16.5 |

The feed from Table 16 was hydrotreated with Akzo Nobel KF848 catalyst under the following hydrotreating conditions: 340° C., 0.7 v/v/h, 1000 psig (6996 kPa), 1500 scf/B $H_2$ (267 $m^3/m^3$). The hydrotreated product's 370° C.+yield was 94.6 wt. % on feed. The hydrotreated product's properties are given in Table 17.

TABLE 17

| Viscosity, cSt at 100° C. | 7.2 |
|---|---|
| Nitrogen, Wppm | 5 |
| Sulfur, Wppm | 1 |

The hydrotreated product was hydrodewaxed with an ex-situ sulfided ZSM-48 catalyst at the following conditions: 1 v/v/h, 1000 psig (6996 kPa), 2500 scf/B $H_2$ (445 m³/m³). The ZSM-48 catalyst (Example 1) was ex-situ sulfided with 400 ppm $H_2S$ in nitrogen to $H_2S$ breakthrough. The hydrodewaxed results are given in Table 18.

TABLE 18

| | |
|---|---|
| Average Reactor Temp. ° C. | 329 |
| 370° C. + Yield, wt. % on feed to HDW | 60.3 |
| 370° C. + Product Properties | |
| Viscosity at 100° C. (cSt) | 6.3 |
| VI | 147 |
| Pour Point (° C.) | −21 |

Example 7

This process illustrates that processing clean feeds over a reduced hydrodewaxing catalyst can produce a high quality dewaxed oil at excellent yield. The feed is a 600 N slack wax whose properties are given in Table 19.

TABLE 19

| | |
|---|---|
| Viscosity, cSt at 100° C. | 7.95 |
| Nitrogen, Wppm | 14 |
| Sulfur, Wppm | 912 |
| Oil in wax, wt. % | 16.5 |

The feed from Table 22 was hydrotreated with Akzo Nobel KF848 catalyst under the following hydrotreating conditions: 340° C., 0.7 v/v/h, 1000 psig (6996 kPa), 1500 scf/B $H_2$ (267 m³/m³). The hydrotreated product's 370° C.+yield was 93.9 wt. % on feed. The hydrotreated product's properties are given in Table 20.

TABLE 20

| | |
|---|---|
| Viscosity, cSt at 100° C. | 7.2 |
| Nitrogen, Wppm | 5 |
| Sulfur, Wppm | 1 |

The hydrotreated product was hydrodewaxed with a reduced ZSM-48 catalyst (35 wt. % alumina/0.6 wt. % Pt) at the following conditions: 1 v/v/h, 1000 psig (6996 kPa), 2500 scf/B $H_2$ (445 m³/m³). The hydrodewaxed results are given in Table 21.

TABLE 21

| | |
|---|---|
| Average Reactor Temp. ° C. | 338 |
| 370° C. + Yield, wt. % on feed to HDW | 60.4 |
| 370° C. + Product Properties | |
| Viscosity at 100° C. (cSt) | 6.1 |
| VI | 146 |
| Pour Point (° C.) | −25 |

The results from Table 21 demonstrate that a very high VI product can be obtained in high yields from a waxy feed.

Example 8

This example illustrates that processing clean feeds having higher oil in wax content can produce a high quality dewaxed oil at excellent yield. The feed is a 600 N slack wax whose properties are given in Table 22.

TABLE 22

| | |
|---|---|
| Viscosity, cSt at 100° C. | 8.2 |
| Nitrogen, Wppm | 20 |
| Sulfur, Wppm | 1289 |
| Oil in wax, wt. % | 25.3 |

The feed from Table 22 was hydrotreated with Akzo Nobel KF848 catalyst under the following hydrotreating conditions: 340° C., 0.7 v/v/h, 1000 psig (6996 kPa), 1500 scf/B $H_2$ (267 m³/m³). The hydrotreated product's 370° C.+yield was 95.8 wt. % on feed. The hydrotreated product's properties are given in Table 23.

TABLE 23

| | |
|---|---|
| Viscosity, cSt at 100° C. | 7.4 |
| Nitrogen, Wppm | 4 |
| Sulfur, Wppm | 1 |

The hydrotreated product was hydrodewaxed with an ex-situ sulfided ZSM-48 catalyst at the following conditions: 1 v/v/h, 1000 psig (6996 kPa), 2500 scf/B $H_2$ (445 m³/m³). The ZSM-48 catalyst (Example 1) was ex-situ sulfided with 400 ppm $H_2S$ in nitrogen to $H_2S$ breakthrough. The hydrodewaxed results are given in Table 24.

TABLE 24

| | |
|---|---|
| Average Reactor Temp. ° C. | 329 |
| 370° C. + Yield, wt. % on feed | 61 |
| 370° C. + Product Properties | |
| Viscosity at 100° C. (cSt) | 6.8 |
| VI | 142 |
| Pour Point (° C.) | −22 |

The invention claimed is:

1. A process for preparing a lubricating oil basestock having a VI of at least about 135 which comprises:
    (1) hydrotreating a lubricating oil feedstock having a wax content of at least about 60 wt. %, based on feedstock, with a hydrotreating catalyst under effective hydrotreating conditions such that less than 5 wt. % of the feedstock is converted to 650° F. (343° C.) minus products to produce a hydrotreated feedstock whose VI increase is less than 3 greater than the VI of the feedstock;
    (2) stripping the hydrotreated feedstock to separate gaseous from liquid product; and
    (3) hydrodewaxing the liquid product with a dewaxing catalyst which is ZSM-48 under catalytically effective hydrodewaxing conditions wherein the dewaxing catalyst contains at least one of Pt or Pd and hydrodewaxing produces a dewaxed product having a pour point of −17° C. or less.

2. The process of claim 1 wherein the hydrotreating catalyst contains at least one Group 6, Group 9 or Group 10 metal.

3. The process of claim 1 wherein the hydrotreating conditions include a temperature of from 150-400° C., a pressure of from 1480-20786 kPa, a liquid hourly space velocity from 0.1-10 hr$^{-1}$ and a hydrogen treat rate of 89-1780 m³/m³.

4. The process of claim 1 wherein hydrodewaxing conditions include a temperature of from 250-400° C., a pressure of from 791-20786 kPa, a liquid hourly space vejocity from 0.1-10 hr$^{-1}$ and a hydrogen treat rate of 45-1780 m$^3$/m$^3$.

5. The process of claim 1 wherein the dewaxing catalyst is sulfided, reduced, or sulfided and reduced.

6. The process of claim 1 wherein hydrodewaxed liquid product from step (3) is hydrofinished under effective hydrofinishing conditions.

7. The process of claim 6 wherein the hydrofinishing includes a hydrofinishing catalyst containing at least one Group 6, Group 9 or Group 10 metal.

8. The process of claim 6 wherein the hydrofinishing includes a hydrofinishing catalyst which is a mesoporous catalyst from the M41S family.

9. The process of claim 8 wherein the hydrofinishing catalyst contains at least one noble metal.

10. A process for preparing a lubricating oil basestock having a VI of at least about 125 which comprises:
(1) hydrotreating a lubricating oil feedstock having a wax content of at least about 50 wt. %, based on feedstock, with a hydrotreating catalyst under effective hydrotreating conditions such that less than 5 wt. % of the feedstock is converted to 650° F. (343° C.) minus products to produce a hydrotreated feedstock to produce a hydrotreated feedstock whose VI increase is less than 3 greater than the VI of the feedstock;
(2) stripping the hydrotreated feedstock to separate gaseous from liquid product;
(3) hydrodewaxing the liquid product with a dewaxing catalyst which is ZSM-48 under catalytically effective hydrodewaxing conditions wherein the dewaxing catalyst contains at least one of Pt or Pd and hydrodewaxing produces a dewaxed product having a pour point of −17° C. or less; and
(4) hydrofinishing the product from step (3) with a mesoporous hydrofinishing catalyst from the M41S family under hydrofinishing conditions.

11. The process of claim 10 wherein the hydrotreating conditions include a temperature of from 150-400° C., a pressure of from 1480-20186 kPa, a liquid hourly space velocity from 0.1-10 hr$^{-1}$ and a hydrogen treat rate of 89-1780 m$^3$/m$^3$.

12. The process of claim 10 wherein hydrodewaxing conditions include a temperature of from 250-400° C., a pressure of from 91-20786 kPa, a liquid hourly space velocity from 0.1-10hr$^{-1}$ and a hydrogen treat rate of 45-1780 m$^3$/m$^3$.

13. The process of claim 10 wherein the M418 family includes MCM-41, MCM-48 and MCM-50.

14. The process of claim 13 wherein the M41S family is MCM-41.

15. The process of claim 10 wherein hydrofinishing conditions include a temperature of from 150-350° C., a pressure of from 2889-20786 kPa, a liquid hourly space velocity from 0.1-5 hr$^{-1}$ and a hydrogen treat rate of 45-1780 m$^3$/m$^3$.

16. The process of claim 10 wherein the dewaxing catalyst is sulfided, reduced, or sulfided and reduced.

17. The process of claim 10 wherein the hydrotreating catalyst contains at least one Group 6, Group 9 or Group 10 metal.

18. The process of claim 10 wherein the hydrofinishing catalyst contains at least one noble metal.

19. The process of claim 18 wherein the noble metal is at least one of Pt or Pd.

20. A process for preparing a lubricating oil basestock having a VI of at least about 135 which comprises:
(1) hydrotreating a lubricating oil feedstock having a wax content of at least about 60 wt. %, based on feedstock, with a hydrotreating catalyst under effective hydrotreating conditions such that less than 5 wt. % of the feedstock is converted to 650° F. (343° C.) minus products to produce a hydrotreated feedstock to produce a hydrotreated feedstock whose VI increase is less than 3 greater than the VI of the feedstock;
(2) stripping the hydrotreated feedstock to separate gaseous from liquid product;
(3) hydrodewaxing the liquid product with a dewaxing catalyst which is ZSM-48 under catalytically effective hydrodewaxing conditions wherein the dewaxing catalyst contains at least one of Pt or Pd wherein hydrodewaxing produces a 370° C.+dewaxed product in a yield of greater than 50 wt. % based on feed to the hydrodewaxing and having a pour point of −17° C. or less, and
(4) hydrofinishing the product from step (3) with MCM-41 under hydrofinishing conditions wherein hydrofinished product has an aromatics content of about zero.

21. The process of claim 20 wherein the hydrotreating conditions include a temperature of from 150-400° C. a pressure of from 1480-20786 kPa, a liquid hourly space velocity from 0.1-10 hr$^{-1}$ and a hydrogen treat rate of 89-1780 m$^3$/m$^3$.

22. The process of claim 20 wherein the dewaxing catalyst is sulfided, reduced, or sulfided and reduced.

23. The process of claim 20 wherein hydrodewaxing conditions include a temperature of from 250-400° C., a pressure of from 791-20786 kPa, a liquid hourly space velocity from 0.1-10 hr$^{-1}$ and a hydrogen treat rate of 45-1780 m$^3$/m$^3$.

24. The process of claim 20 wherein hydrofinishing conditions include a temperature of from 150-350° C., a pressure of from 2889-20786 kPa, a liquid hourly space velocity from 0.1-5 hr$^{-1}$ and a hydrogen treat raze of 45-1780 m$^3$/m$^3$.

25. The process of claim 20 wherein the feedstock wax content is at least about 75 wt. %.

26. The process of claim 20 wherein MCM-41 contains at least one of Pt or Pd.

* * * * *